S. D. R. BRAUN.
CEILING LIGHT STRUCTURE.
APPLICATION FILED DEC. 11, 1911.
1,116,233.
Patented Nov. 3, 1914.
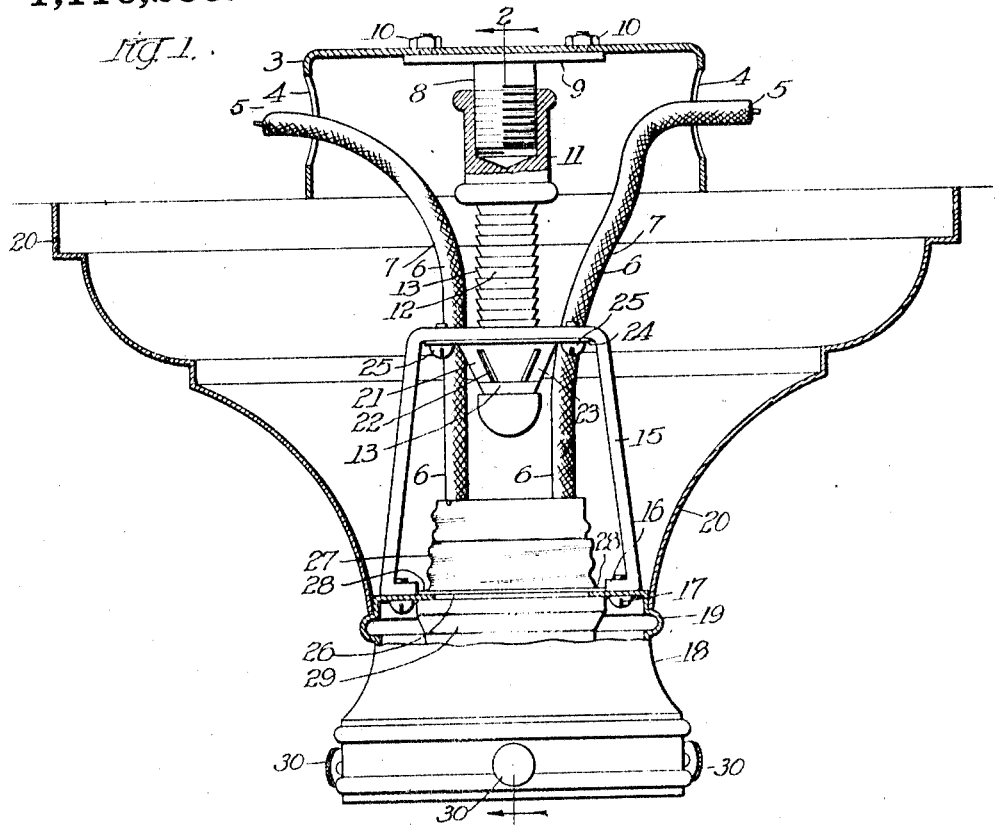
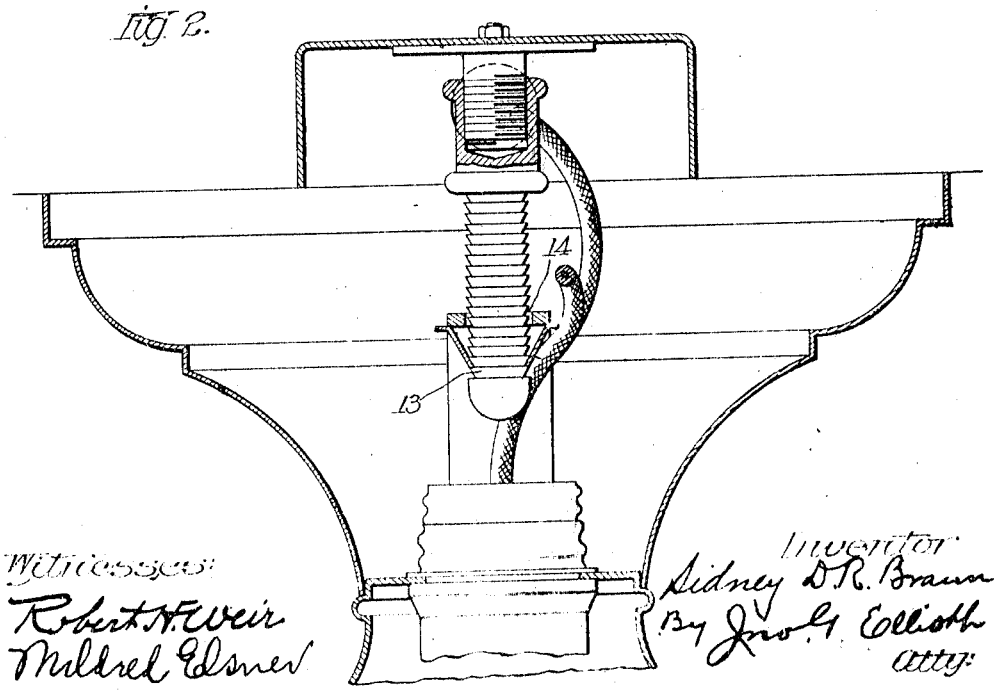
Witnesses:
Robert H. Weir
Mildred Elsner
Inventor:
Sidney D. R. Braun
By Jno. G. Elliott
Atty.

UNITED STATES PATENT OFFICE.

SIDNEY D. R. BRAUN, OF CHICAGO, ILLINOIS.

CEILING-LIGHT STRUCTURE.

1,116,233.

Specification of Letters Patent.

Patented Nov. 3, 1914.

Application filed December 11, 1911. Serial No. 665,122.

*To all whom it may concern:*

Be it known that I, SIDNEY D. R. BRAUN, a citizen of the United States, and resident of Chicago, in the county of Cook and State of Illinois, have invented certain new and useful Improvements in Ceiling-Light Structures, of which the following is a full, clear, and exact specification.

This invention relates to improvements in ceiling light structures, in which the junction-box or outlet in the ceiling is concealed by a canopy intended to be fitted close against the ceiling, and which heretofore, has been connected to the junction-box stud or pipe by an insulated joint fitted upon said stud or gaspipe outlet, and into a coupling, fitted to the hub of the canopy, and provided with side openings for the electric wires connecting the junction-box with a socket piece suspended by said coupling and surrounded by a casing screwed into a cap rigidly suspended from the hub of the canopy.

In the prior structures above referred to, the coupling connecting the junction-box stud or pipe outlet with the hub of the canopy must be of predetermined length varying with stud or pipe outlets differing in length, with the result that there must be as many couplings of differing lengths as there are studs or pipe outlets varying in length, and which is not only objectionable because expensive, in that even with couplings of predetermined length the canopy does not fit tight and neatly against the ceiling, but that an objectionable length of time is required to assemble the parts and connect them in their operative position to the junction-box or pipe outlet, or plain outlet with a cross foot.

The prime object of my invention is to not only dispense with coupling connections of predetermined length, for canopies to be placed in outlets of varying lengths, but to suspend a ceiling light structure from the junction-box, a pipe outlet or plain outlet with a cross foot by connections characterized in that they are adjustable to stud and pipe outlets differing in length, and thereby provide a means by which the canopy may be moved to its operative position against a ceiling and automatically locked against possible accidental detachment.

A further object of my invention is to dispense with any necessity for an insulating joint at any point in the connection of the socket with the stud of the junction-box or pipe outlet, and for the employment of screw threads at any point in the connection between the junction-box and the lamps other than at the jointure of the canopy with the stud of the junction-box.

Another object of my invention is to provide between the canopy structure and the bolt, or rod, suspending it directly from the junction-box, an adjustable automatically operating locking device for the canopy.

With these ends in view, my invention finds embodiment in certain features of novelty in the construction, combination and arrangement of parts by which the said objects and certain other objects are hereinafter obtained, all as fully described with reference to the accompanying drawing, and more particularly pointed out in the claims.

In said drawing: Figure 1 illustrates in elevation a ceiling light structure in which my invention finds embodiment, with the junction-box, canopy and shade holder partly broken away. Fig. 2 illustrates a similar section taken on the line 2—2 of Fig. 1 looking in the direction of the arrows.

Similar characters of reference indicate the same parts in both figures of the drawing.

3 indicates a junction-box provided with the usual opening 4—4 for the introduction of the insulated line wires 5—5, at opposite sides thereof subsequently spliced at the wires 6—6 of the ceiling light as indicated at 7—7, and having the usual screw bolt 8 integral with the plate 9 secured to the top end of the junction-box by the bolt and screws 10—10 and countersunk as is usual in a ceiling.

Screw threaded on and suspended from the bolt 8 is a socket piece 11 preferably integral with a suspended post 12 provided substantially its entire length with a series of annular ratchet teeth 13 and adapted to freely pass through a perforation 14 in a U-shaped bracket 15 bent at its free ends at 16 and secured by screws 17 to a shade holder 18, which is provided with a bead like flange 19, forming the base support for a ceiling plate of the canopy 20. The canopy 20 is, as usual, of thin metal, preferably spun, and of any common or desired form, and of a sufficient diameter to conceal the junction-box with its upper edge forming a close joint with the ceiling, but in any event contracted at its lower end to set upon and be supported by a flange 19 on the shade holder 18.

With the canopy in its operative position against the ceiling, concealing the junction-box, the post 12 projects through the perforation 14 in the bracket 15 on the underside of the top bar of which is a truncated cone 21 of spring metal provided at intervals with slits 22 forming spring tongues 23 and with a flange 24 secured to the top bar of the bracket 15 by screws 25, the diameter of the truncated end of the cone being such that when the cone is pushed upwardly upon the post 12, the ends of the tongues 23 will clamp the post 12 at a point between and at the base of the ratchet teeth, and thereby lock the cone and with it the bracket 15 at whatever point the tongues may be, on the post when the canopy is close against the ceiling, this engagement of the spring tongues with the post serving to lock the canopy in its operative position against the ceiling the instant it is moved to that position.

Shade holder 18 is provided with a center opening 26 on which is seated a screw threaded sheet metal collar 27 by means of a flange 28 projecting laterally therefrom and into which is fitted the usual porcelain insulator 29 inclosing the contacts (not shown) for the insulated wires 6—6 and whereby the insulating structure may not only be quickly but conveniently inserted to place. The shade holder 18 may be of any desired form, and as usual is provided with thumb screws 30—30 for securing a shade (not shown) in its operative position thereon.

For installing the ceiling light structure of my invention the splice between the junction-box wires and the wires of the ceiling light is made either before or after screwing the post 12 to its operative position on the screw bolt 8, depending upon the length of wire projecting either from the junction-box or the ceiling light structure, with which both are provided, as for example if there is considerable length of wire, the splice may be made before inserting the post, but if there is but little slack in the wires after they are spliced then the wires are spliced after seating the post and passing it through the top bar of the bracket 15. In either event, however, as soon as the wires are spliced the ceiling light structure is moved upwardly until the canopy is in close contact with the ceiling and at which moment the tongues 23 will seat themselves in the then adjacent groove between the ratchet teeth and thereby lock the entire structure in its operative position against accidental detachment, and from which it can only be unlocked for removal by forcing the tongues outwardly from engagement with the annular ratchet teeth and maintaining them in this outward position until entirely disengaged from the post, or removing screws 17.

From the foregoing it will now be seen that my invention dispenses with the predetermined fixed length of couplings heretofore referred to connecting the ceiling light structure with the junction-box, and provides for a connection by means of which ceiling light canopies may be moved to close contact with a ceiling and automatically locked against accidental movement away from the ceiling by a very simple construction of quickly operating means when stud or pipe outlets to which the ceiling light is attached vary in length. The embodiment of my invention, however, is not limited to the precise construction, form and arrangement of the devices for accomplishing these two most important results but includes any means by which they or either of them is made practical and possible.

Having described my invention, what I claim and desire to secure by Letters Patent is:

1. A ceiling light structure comprising in combination a canopy, a lamp socket, line wires secured to said socket, passing directly from a ceiling through the canopy, and means suspending the canopy beneath, adjustable to and locking it in contact with a ceiling on pushing the canopy along a direct line to contact therewith.

2. A ceiling light structure comprising in combination a canopy, a lamp socket, line wires secured to said socket, passing directly from a ceiling through the canopy, and yielding means whereby the canopy is suspended beneath, is adjustable to and locked against a ceiling on pushing the canopy in a direct line to contact therewith.

3. A ceiling light structure comprising in combination a canopy, a lamp socket, line wires secured to said socket, passing directly from a ceiling through the canopy, means connected with the socket for supporting the canopy, a ceiling post provided with annular ratchet teeth, yielding means connecting the canopy structure with said post, and whereby on pushing the canopy on a direct line toward a ceiling it is adjusted to and locked in contact with the ceiling, substantially as described.

4. A ceiling light structure comprising in combination a canopy, a shade holder supporting said canopy, a lamp socket secured to said shade holder, a bracket mounted on said holder, a post provided with annular ratchet teeth suspended from the ceiling, and a flexible nut working and adjustable upon said post, whereby a canopy is adjustable to a ceiling, and when pushed in a direct line against a ceiling is automatically locked in contact therewith.

5. A ceiling light structure comprising in combination a shade holder, a canopy removably supported thereon, a flanged screw-threaded socket-piece seated on the shade holder and adapted to receive the insulating member of the socket, and electric wire conductors for the socket, substantially as described.

6. A ceiling light structure comprising in combination a shade holder, a screw threaded metal socket member and a bracket secured to the shade holder, a canopy, an annular seat for the canopy projecting from the shade holder, a junction-box, a post provided with annular teeth suspended from said box, and an adjustable locking device depending from the bracket and adjustable upon said post, substantially as described.

In witness whereof, I have hereunto set my hand and affixed my seal, this 4th day of November A. D. 1911.

SIDNEY D. R. BRAUN. [L. S.]

Witnesses:
   JNO. G. ELLIOTT,
   MILDRED ELSNER.